Nov. 3, 1964 A. R. DAVIDSON 3,155,899

METHOD AND APPARATUS FOR DETERMINING MOISTURE CONTENT AND OTHER VARIABLES UTILIZING A CAPACITOR TEST CELL AT TWO DIFFERENT FREQUENCIES

Filed Feb. 26, 1957 2 Sheets-Sheet 1

INVENTOR.
ALLEN R. DAVIDSON
BY Ely, Fryed Hamilton
ATTORNEYS

Nov. 3, 1964 A. R. DAVIDSON 3,155,899
METHOD AND APPARATUS FOR DETERMINING MOISTURE CONTENT AND OTHER VARIABLES UTILIZING A CAPACITOR TEST CELL AT TWO DIFFERENT FREQUENCIES
Filed Feb. 26, 1957 2 Sheets-Sheet 2
FIG. 2
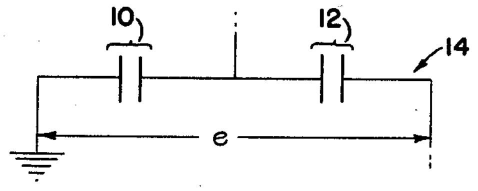
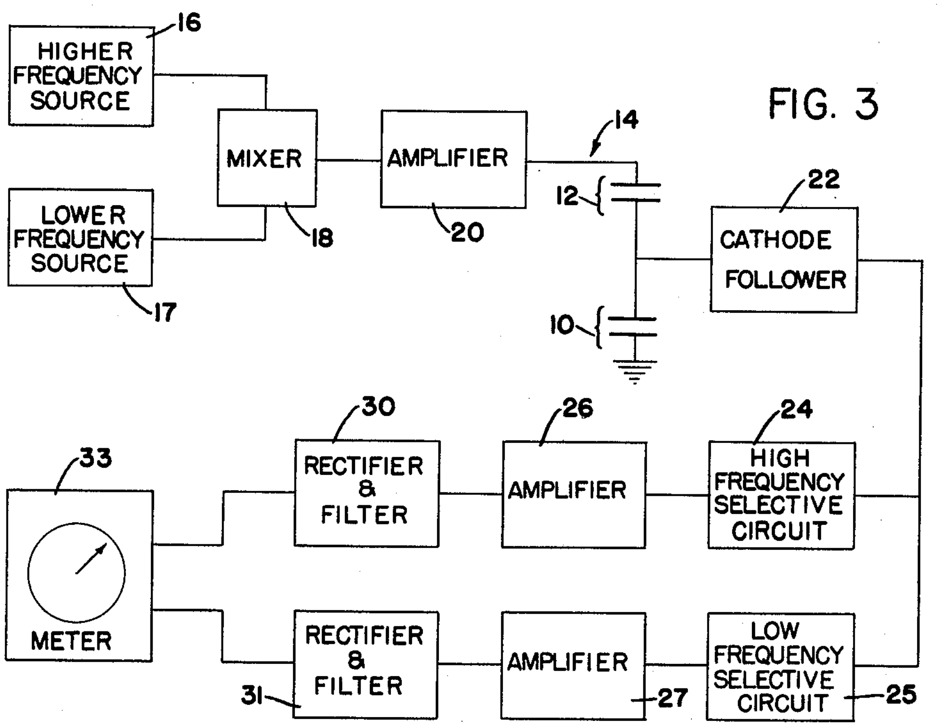
FIG. 3
*INVENTOR.*
ALLEN R. DAVIDSON
*BY* Ely, Fryer & Hamilton
ATTORNEYS United States Patent Office 3,155,899

Patented Nov. 3, 1964

3,155,899

METHOD AND APPARATUS FOR DETERMINING MOISTURE CONTENT AND OTHER VARIABLES UTILIZING A CAPACITOR TEST CELL AT TWO DIFFERENT FREQUENCIES

Allen R. Davidson, Erie, Pa., assignor, by mesne assignments, to Industrial Nucleonics Corporation, Columbus, Ohio, a corporation of Ohio Filed Feb. 26, 1957, Ser. No. 642,525
13 Claims. (Cl. 324—61)

The present invention relates to improvements in determining the moisture content or other variable constituents of a dielectric material. More particularly, the invention relates to determining the moisture content of a material by measuring the change in the capacitance of a capacitor being used as a test cell.

It is an object of the present invention to provide an improved capacitance measuring system for determining the content of moisture or similar constitutents of a dielectric material. Such systems are based upon the knowledge that the moisture content of a material located between the plates of a test cell capacitor has a direct effect upon the capacitance of the test cell.

It is a further object of the invention to provide a capacitance measuring system for determining moisture content which for more accurate results preferably utilizes alternating current frequencies of 6000 cycles or less (per second). Known prior systems have utilized frequencies of at least 100 kilocycles (per second), while certain systems such as that shown in Patent No. 2,665,409, Rogers, utilize voltages of radio frequency above 3 megacycles and preferably in the range of 3500 kilocycles (per second).

Further, it is an object to provide a capacitance measuring system in which two voltages having different frequencies, preferably 6000 cycles or less, are simultaneously applied to a voltage divider circuit including a test cell capacitor and a known value capacitor.

Still further, it is an object of the invention to provide a capacitance measuring system which may be readily adapted for multi-point recording which in turn facilitates simultaneous measurement and recording of several streams of material to be measured for moisture content.

These and other objects as well as the advantages of the invention will be apparent in view of the following description thereof taken with the attached drawings.

In the drawings:

FIG. 2 is a schematic diagram of a voltage divider circuit; and,

FIG. 3 is a schematic diagram, in block or component form, showing apparatus suitable for practice of the invention.

Figure 1:
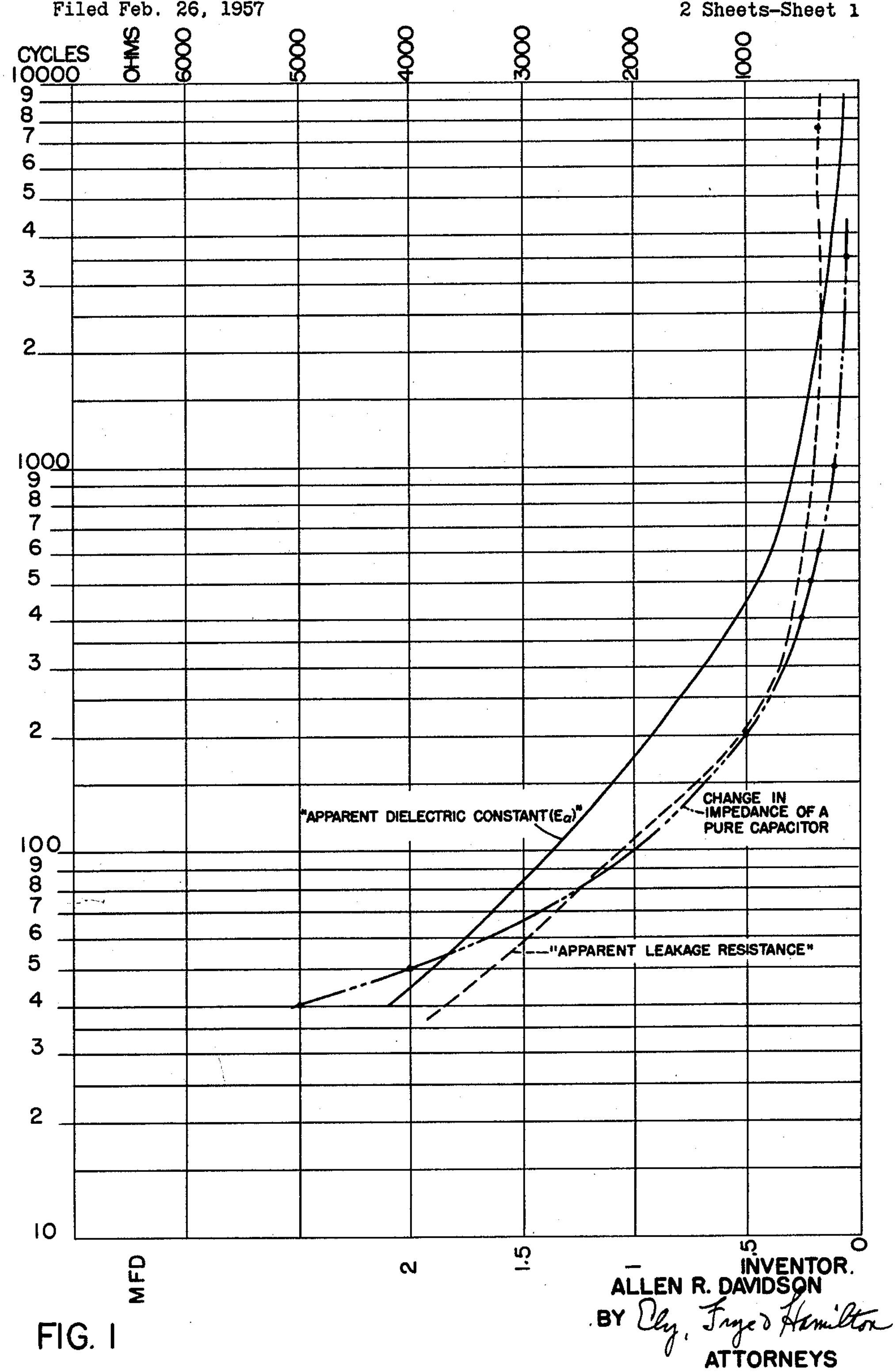
FIG. 1 is a graph with three curves showing the change in "apparent dielectric constant," in "leakage resistance" and in the impedance of a pure capacitor; each with change in frequency below 6000 cycles.

It has been found that when alternating voltages at low frequencies, such as 6000 cycles per second or less, are applied to a test cell capacitor having a "moisture laden" material between the plates, the "apparent dielectric constant" ($\epsilon_a$) of the material will vary as an inverse function of the voltage frequency. There are three factors that govern a capacitor's capacitance: one, the distance ($d$) between the plates; two, the area (A) of the plates facing each other; and, three, the dielectric constant ($\epsilon$) of the insulative material between the plates. Thus, if $d$ and A remain constant, and a change in the capacitance (C) of a test cell is observed when a dielectric material having various degrees of moisture content is placed therein, it indicates a change in the dielectric constant of the material. This phenomena which has been observed at low frequencies is designated as $\epsilon_a$ (apparent dielectric constant). Therefore, since $\epsilon_a$ varies inversely as a function of a low frequency such as 6000 cycles or less, the higher the frequency, the lower the $\epsilon_a$ of the dielectric material and vice versa.

It has also been found that the "apparent leakage resistance" i.e., in phase conduction, of a test cell capacitor, due to the presence of moisture will change as an inverse function of frequency. Therefore, the higher the frequency, the lower the "apparent leakage resistance" of the test cell capacitor; and vice versa. Again, as in the case of $\epsilon_a$, this phenomenon is most pronounced at low frequencies of 6000 cycles or less.

The plates, or electrodes, of the test cell are coupled together by the dielectric material therebetween and are thus coupled both resistively and capacitively. The admittance of the test cell is a combination of this capacitance and resistance. This admittance is a function of the dielectric quality of the material, which, since there are resistive as well as capacitive components, has an imaginary component. By definition this complex dielectric quality is the complex dielectric constant of the material.

In FIG. 1, the solid line curve depicts the change, as an inverse function of frequency, of $\epsilon_a$. The dotted line curve depicts the change, as an inverse function of frequency, of apparent leakage resistance. These values were determined using a test cell capacitor having 4" square plates spaced approximately one inch apart using a mass of cotton material wetted with predetermined amounts of distilled de-ionized water.

It is known that a capacitance voltage divider circuit will divide an alternating voltage inversely as the ratio of the capacitances of two series connected capacitors. This phenomenon, i.e., the division of voltage, occurs independent of frequency. Referring to FIG. 2, there is shown schematically a voltage divider circuit with the test cell capacitor being indicated at 10 and a known value capacitor being indicated at 12. When a current having a frequency of 6000 cycles or less is applied to a test cell 10 with moisture laden material therein, the voltage across the capacitor 12 will vary directly as a function of any change in the apparent dielectric constant ($\epsilon_a$).

With respect to the apparent leakage resistance, the dotted line curve of such resistance in FIG. 1, closely approximates the calculated chain line curve in FIG. 1 representing the change in the impedance of a pure capacitor with change in frequency. Thus, in a circuit such as shown in FIG. 2, the leakage currents or conduction of the test cell 10 in themselves will produce negligible voltage differences across the capacitor 12 at various frequencies in the range below 6000 cycles. Known prior systems can obviate this problem of error attributable to leakage resistance only by the use of high frequency currents.

These several independent phenomena are combined in apparatus such as shown schematically in FIG. 3, in the following manner. Equal voltages at two different frequencies, preferably in the range below 6000 cycles, are simultaneously applied to a voltage divider circuit consisting of the test cell 10 and capacitor 12. The voltage developed across the test cell at each frequency depends upon the admittance of the test cell at that frequency and hence is a function of the complex dielectric constant of the material. The difference in amplitude of the two superimposed voltages which appear across either capacitor is a function of the dielectric material in the test cell. Thus, suitable measuring means sensing the difference in amplitude and calibrated so as to afford a comparison of the two amplitudes will indicate the percentage and moisture present in the test cell 10.

Preferably, the measuring means functions as follows:

Two different voltages of 6000 cycles or less are superimposed and are fed through the voltage divider circuit into the grid circuit of a vacuum tube amplifier; for example, a triode tube cathode follower. In any event, the amplifier must have an extremely high input impedance so that a negligible load is imposed on the divider circuit. The output of the amplifier preferably feeds two frequency selective circuits, one for each applied frequency, which in turn feed individual amplifiers which are balanced so that each has approximately the same gain. The output of the individual amplifier for each frequency is then rectified and the resulting direct current voltages are compared by suitable circuitry.

The means for comparing the rectified component of each applied voltage expresses the difference between the potentials of the two direct current voltages in terms of a single potential which is analogous to the percentage of moisture in the test cell 10. Such comparative means may function in conjunction with an individual meter calibrated in terms of moisture content, or the single potential may be transmitted a considerable distance to actuate suitable controllers in a continuous flow process. Also, several single potentials from several test units may be fed into a multipoint recorder and meter.

Referring to FIG. 3, in addition to the test cell 10, the known value capacitor 12 and the voltage divider circuit indicated generally at 14, a preferred form of apparatus according to the invention includes two sources 16 and 17 of sine wave voltages providing pure alternating currents of 6000 cycles or less.

A basic premise of the invention is founded upon the fact that below 6000 cycles, the change in the apparent dielectric constant ($\epsilon_a$) varies markedly with a small change in frequency. Therefore, in order to obtain a more precisely defined $\epsilon_a$ effect, it is desirable to employ significantly different frequencies. For example, while in a preferred form of the invention the voltage from source 16 is 6000 cycles and the voltage from source 17 is only 40 cycles, the frequencies could also be 5000/500, 4000/400, 3000/300, etc.

Referring to FIG. 1, it will be observed that the solid line representing change in the apparent dielectric constant ($\epsilon_a$), has a pronounced knee in the vicinity of 1000 cycles. As the frequency becomes lower, the value of $\epsilon_a$ changes markedly. Therefore, it is preferred that the two frequencies differ from each other by the factor of at least 6 to 1. Thus, the preferred operating range for the two frequencies runs from 6000/1000 to about 240/40.

The two different voltages are superimposed or superpositioned in a conventional voltage mixer 18 and preferably led into a conventional power amplifier 20. If desired, one pair of sources 16 and 17, and a mixer 18 and amplifier 20 may feed a plurality of voltage divider circuits 14.

In the apparatus shown in FIG. 3, the voltage divider circuit 14 includes a test cell capacitor 10 which is connected to ground. If desired, the position of capacitors 10 and 12 could be reversed with the known value capacitor being connected to ground. However, the ratio of the capacitances must be such that the voltage supplied to the grid of the amplifier or cathode follower 22 will be in the amplifier's operating range. Thus, the signal must be of sufficient voltage for operation of the succeeding circuits yet the voltage should not be so strong as to overdrive the succeeding circuits.

The superimposed voltages, as altered by the $\epsilon_a$ of the test cell 10 and as transferred by the cathode follower 22, then pass through two conventional frequency selective circuits 24 and 25, each being tuned for a specific frequency as supplied by the sources 16 and 17. Circuit 24 allows only the higher frequency (e.g. 6000 cycles) to pass. Circuit 25 allows only the lower of the two different frequencies (e.g. 40 cycles) to pass. Following the frequency selective circuits there are duplicate amplifiers 26 and 27, one for each now separated voltage. The amplifiers 26 and 27 are conventional though each has a balancing means so that the gain will be identical for each amplifier.

From the amplifiers 26 and 27, each voltage is fed into a conventional rectifier and filter network. Rectifier 30 converts the high frequency voltage to a direct current potential while rectifier 31 does the same for the lower frequency voltage. These two direct current potentials are then fed into and opposed within a meter 33 which is calibrated in terms of percent of moisture. The greater the value of the resulting single potential, that is the greater the voltage due to the lower frequency is in comparison with the voltage due to the higher frequency, the higher the moisture content of the dielectric material.

The apparatus of the invention is employed in conjunction with suitable apparatus for conveying the dielectric material to and away from the test cell 10. It is desirable that the material to be tested be passed between the plates of the test cell 10 in a confined stream of constant volume and under a constant pressure head. The test cell itself, and the complementary material conveying apparatus are of conventional construction, such as shown for e.g. in the aforementioned Patent No. 2,665,409.

The apparatus and method of the invention were developed primarily for use in determining the moisture content of grain and animal feed mixtures. However, other pulverulent or free flowing dielectric materials having moisture or similar constituents could also be tested thereby. These and other modifications, such as measuring the moisture content of batch samples or solid materials, may suggest themselves to those skilled in the art and therefore it is intended that the scope of the invention be limited only by the subjoined claims.

What is claimed is:

1. Apparatus for determining the amount of moisture or a similar variable constituent in a dielectric material while said material is in a confined stream of constant volume between the plates of a capacitor test cell, comprising, a voltage divider circuit having said test cell and a known value capacitor connected in series, sources supplying separate voltages of different frequencies, means for superimposing said separate voltages and applying said superimposed voltages across said divider circuit, and means for comparing said superimposed voltages after passage through said divider circuit and producing an output voltage proportional to the difference in the amplitude of said voltages which is analogous to the amount of moisture present in said dielectric material.

2. Apparatus for determining the amount of moisture or a similar variable constituent in a dielectric material while said material is in a confined stream of constant volume between the plates of a capacitor test cell, comprising, a voltage divider circuit having said test cell and a known value capacitor connected in series, two sources supplying separate voltages having substantially different frequencies, mixing means for superimposing said two voltages and applying said superimposed voltages across said divider circuit, means connected to said divider circuit for amplifying said superimposed voltages, two frequency selective circuits connected to said amplifying means for separating said different voltages, means for rectifying each of said separated voltages, and means for comparing the difference in potential between said rectified voltages and producing a signal indicative of said potential difference which is analogous to the amount of moisture present in said dielectric material.

3. A method for determining the amount of moisture or a similar variable constituent in a dielectric material, comprising the steps of, passing said material in a stream of constant volume between the plates of a capacitor test cell, said test cell together with the material therein constituting a portion of a voltage divider circuit, the remainder of the divider circuit including a known value capacitor in series with said test cell, simultaneously applying to said divider circuit separate voltages of different frequencies, and comparing said voltages after passage through said divider circuit to derive a signal proportional to the difference in the amplitude of said voltages which is analogous to the amount of moisture in said material.

4. Apparatus for quantitative determination of at least one property of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the complex dielectric constant of said material at the frequency of that source, and means for combining said separate signals to produce a continuous resultant signal quantitatively indicative of said property.

5. Apparatus for quantitative determination of at least one property of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the complex dielectric constant of said material at the frequency of that source, and means for combining said separate signals to produce a continuous resultant signal quantitatively indicative of said property, said means for deriving separate signals including filters tuned to the frequencies of the respective sources.

6. Apparatus for quantitative determination of the moisture content of a dielectric material, said apparatus comprising a first source of electrical signals at a first frequency, a second source of electrical signals at a second frequency, detecting means, and capacitive probe means coupled to said first and second sources and having spaced electrodes arranged for simultaneously applying electrical signals from said first and second sources to at least a portion of said material and coupling said detecting means to said portion, said detecting means including means for deriving separate signals each resulting from the signals applied to said portion from a respective source as these applied signals are influenced by the complex dielectric constant of said material at the frequency of that source, and means for combining said separate signals to produce a continuous resultant signal indicative of said moisture content.

7. Apparatus for quantitative determination of at least one property of a dielectric material, said apparatus comprising a plurality of sources of electrical signals at different respective frequencies, detecting means, and capacitive probe means coupled to said sources and having spaced electrodes arranged for applying electrical signals from said sources to at least a portion of said material and coupling said detecting means to said portion, said detecting means including means for deriving separate signals each resulting from the signals applied to said portion from a respective source as these applied signals are influenced by the complex dielectric constant of said material at the frequency of that source, and means for differentially combining said separate signals to produce a continuous resulting signal quantitatively indicative of said property.

8. A method for quantitatively determining at least one property of a dielectric material under test, said method comprising applying electrical signals at a plurality of different frequencies to at least a portion of the material under test, deriving separate output signals each resulting from and indicative of the voltages thereupon developed between electrodes resistively and capacitively coupled together by a portion of said material to which said applied signals are applied at a respective frequency, and combining said separate signals to produce a continuous resultant signal quantitatively indicative of said property.

9. A method for quantitatively determining at least one property of a dielectric material under test, said method comprising applying electrical signals at a plurality of different frequencies to at least a portion of the material under test, deriving separate output signals each resulting from and indicative of the voltages thereupon developed between electrodes resistively and capacitively coupled together by a portion of said material to which said applied signals are applied at a respective frequency, and differentially combining said separate signals to produce a continuous resultant signal quantitatively indicative of said property.

10. A method for quantitatively determining at least one property of a dielectric material under test, said method comprising passing said material continuously through a test region, applying electrical signals at a plurality of different frequencies to the material in said region, deriving separate output signals each resulting from and indicative of the voltages developed between electrodes resistively and capacitively coupled together by said material in said region at a respective frequency, and combining said separate signals to produce a continuous resultant signal quantitatively indicative of said property.

11. The method of quantitatively determining the moisture content of a dielectric material under test which comprises applying electrical signals at first and second significantly different frequencies to a pair of spaced electrodes defining an electric field region, continuously passing said material through said electric field region whereby the admittance of said electrode pair varies as a function of the complex dielectric constant of said material in said electric field region, generating a first signal indicative of said admittance at said first frequency, generating a second signal indicative of said admittance at said second frequency, and continuously combining said signals to produce a continuous resultant signal indicative of said moisture content.

12. Apparatus for determining the moisture content in material of the type referred to, comprising a test capacitance probe means having spaced electrodes for coupling the probe means to the material, means for coupling to the test probe means at least two voltages of different frequencies, means for obtaining a resultant voltage which is a function of the voltage drops between the electrodes of the test probe means corresponding to each frequency when the material is located between the electrodes, and means responsive to said resultant voltage to give an indication of moisture content.

13. A method for the quantitative determination of at least one property of a dielectric material, said method comprising applying electrical signals at a plurality of different frequencies to at least a portion of the material, deriving separate signals each resulting from the signals applied to said portion at a respective frequency as these applied signals are influenced by the complex dielectric constant of said material at that frequency, and combining said separate signals to produce a continuous resultant signal quantitatively indicative of said property.

References Cited in the file of this patent

UNITED STATES PATENTS

| | | |
|---|---|---|
| 2,527,208 | Berry et al. | July 27, 1944 |
| 2,535,026 | Anderson | Dec. 26, 1950 |
| 2,535,027 | Anderson | Dec. 26, 1950 |
| 2,592,101 | Aiken | Apr. 8, 1952 |
| 2,625,583 | Broding | Jan. 13, 1953 |
| 2,744,233 | Paivinen | May 1, 1956 |
| 2,929,020 | Mayes | Mar. 15, 1960 |
| 2,950,935 | Locher et al. | Aug. 23, 1960 |

FOREIGN PATENTS

| | | |
|---|---|---|
| 622,470 | Great Britain | May 3, 1949 |